Patented Aug. 29, 1939

2,170,825

UNITED STATES PATENT OFFICE 2,170,825

PROPIONIC ACID SYNTHESIS

Donald J. Loder, Wilmington, Del., assignor to E. I. du Pont de Nemours & Company, Wilmington, Del., a corporation of Delaware No Drawing. Application January 27, 1938, Serial No. 187,226

8 Claims. (Cl. 260—532)

This invention relates to an improved process for the preparation of propionic acid and its esters and particularly to the preparation of propionic acid by the interaction of ethanol and carbon monoxide in the presence of boron fluoride as the catalyst.

An object of the invention is to provide a process for the preparation of propionic acid in exceedingly high yields from ethanol and carbon monoxide. A further object of the invention is to provide a process for preparing propionic acid and its ethyl ester from ethanol and carbon monoxide in the presence of such proportions of water and boron trifluoride that substantially 100% conversion of the ethanol to acid and/or ester is obtained. Yet another object of the invention is to provide operating conditions for the aforementioned process under which substantially no undesirable by-products are formed during the reaction. Other objects of the invention will hereinafter appear.

I have found that propionic acid and its ethyl ester can be prepared in exceptionally high yields from carbon monoxide and ethanol, providing boron fluoride is employed as the catalyst in the presence of suitable amounts of water and under the proper temperature conditions. Generally, it may be stated that my improved process involves carrying out the propionic acid synthesis by correlation of boron trifluoride concentration, water concentration and temperature in order that the reaction is effected rapidly and without the formation of condensation products heretofore invariably encountered when ethanol or other higher alcohols have been condensed with carbon monoxide, particularly in the presence of boron halogen-containing catalysts.

The ethanol-carbon monoxide reaction to which this invention is particularly directed may be expressed as follows:

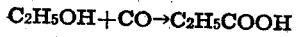

In accordance with the particular operating conditions, it will be found that in some instances propionic acid may not be formed as the acid, but may be produced as the ester by condensation of the acid with the ethyl alcohol used in the process, as indicated below:

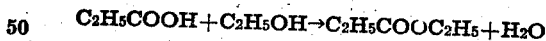

The ethanol used may be replaced, if desired, wholly or partly by diethyl ether or esters of propionic acid, principally ethyl propionate. Furthermore, compounds which decompose upon hydrolysis to give ethanol such, for example, as ethyl chloride, and the like, may likewise be used, although due to its availability, low cost, and adaptability I prefer to employ ethanol as the major raw material.

An aqueous solution of boron trifluoride is preferred as the catalyst, which may be made in various ways such, for example, as by the solution of boron trifluoride in water; by the interaction of anhydrous hydrogen fluoride with boric oxide or boric anhydride; or, if desired, by the introduction of boron trifluoride as a gas directly into the mixture of water, ethanol, ether and/or ester prior to or during the reaction. Other boron fluoride compounds may be employed which contain boron, fluorine and water such, for example, as aqueous solutions of dihydroxy fluoboric acid, borofluohydric acid, and, in general, the oxygenated acids obtained from mixtures of hydrogen fluoride and the boric acids.

Aqueous solutions of boron trifluoride, as well as the other enumerated catalysts are preferably used alone, although agents may be added to promote the activity of these catalysts, if desired, such as free hydrofluoric acid, powdered nickel, nickel oxides, or other powdered metals or metal oxides. Generally, however, I have found it preferable to use aqueous boron trifluoride alone, for it is not only easily prepared but is such a powerful catalyst that further modification by the addition of other substances is not ordinarily necessary.

A careful study of the ethanol-carbon monoxide to propionic acid reaction has revealed that it is desirable to have present sufficient water to inhibit the formation of by-products and tars, and I have determined that it is advantageous to have at least ½ mol of water present per mol of ethanol and preferably 1 to 3 mols of water per mol of the alcohol. Water has the pronounced effect of raising conversion to propionic acid from 50-70% when no water is present, to 90-100% when there are one or more mols of water. The boron trifluoride should be present for optimum operating conditions in the ratio of from 1 to 4 mols per mol of the ethanol and preferably between 2 and 3 mols of boron fluoride per mol of ethanol, and, for some purposes, solutions saturated with boron trifluoride may be used. These concentrations of water and boron trifluoride appear to be unique for the synthesis of propionic acid and give exceptionally high yields if temperature conditions are properly controlled. These conditions can advantageously be used also in the reaction of carbon monoxide with alcohols such as propanol, normal and isobutanol, and, generally speaking, all alcohols higher than methanol, for the preparation of higher organic acids.

For improved operation I have found that when the above concentration of water and boron trifluoride are employed the synthesis should preferably be carried out at temperatures below 180° C. down to approximately 125° C. with preferred temperatures ranging between 135 and 165° C. The pressure should likewise be maintained, for optimum results, above 25 atmospheres and preferably between 500 and 1000 atmospheres.

The carbon monoxide used may be obtained from various commercial sources such, for example, as from water gas, producer gas, coke oven gas and the like, but to obtain products with the highest degree of purity it is preferable to remove from such commercial gases objectionable constituents.

Furthermore, inert gases may be present in the carbon monoxide used and they are, in some instances, desirable. Nitrogen, for example, has, it appears, little deleterious effect on the reaction or yield and, in fact, it may be used advantageously in order to aid in the agitation of the reactants, particularly if the carbon monoxide is to be bubbled through them. Other strictly inert gases will usually act similarly to nitrogen.

While the above description has been directed particularly to the reaction of carbon monoxide with ethanol, diethyl ether, and/or ethyl propionate, I have found that generally the higher alcohols will react similarly to give higher acids. Normal and isopropyl alcohol will give isobutyric acid; normal butyl alcohol will give methyl ethyl acetic acid; isobutyl alcohol will give trimethyl acetic acid and the higher alcohols, corresponding higher acids. When carrying out my process with the higher alcohols, I have found it to be generally true that best results are realized when the reaction is conducted at temperatures below 180° C. down to 125° C. and preferably between 135 and 165° C.

The more detailed practice of the invention is illustrated by the following examples in which parts are given by weight unless otherwise stated. There are, of course, many forms of the invention other than these specific embodiments.

Example 1

A silver-lined autoclave was charged with 806 parts of a mixture containing, on a molal basis, 1 part of ethanol, 1.8 parts of water, and 2.8 parts of boron trifluoride. The autoclave was heated in a shaker machine to a temperature ranging between 138 and 154° C. It was heated to reaction temperature within 28 minutes and maintained at temperature for 20 minutes. Throughout the reaction a pressure of 800 to 900 atmospheres was maintained by the periodic introduction of carbon monoxide as it was absorbed. 871 parts of product was discharged which, upon analysis, gave a yield based upon reactants used of 90% propionic acid and 10% ethyl propionate.

Example 2

A silver-lined autoclave was evacuated and subsequently charged with 692 parts of a mixture containing, on a molal basis, 1 part of ethanol, 0.5 part of water and 1.5 parts of boron trifluoride. Compressed carbon monoxide was then admitted to raise the pressure to approximately 300 atmospheres. With the tube agitated, the charge was then heated within 24 minutes to a temperature between 140 and 152° C. The pressure increased during heating to between 500 and 900 atmospheres. The temperature was maintained within the indicated range for 37 minutes and whenever the gas absorption caused the pressure to fall to 800 atmospheres the pressure was raised again to 900 atmospheres by introducing carbon monoxide from high pressure storage. At the end of the 37-minute reaction period, gas absorption substantially ceased. The autoclave was cooled and 775 parts of product discharged. Upon analysis the product was found to contain a yield based on reactants used of 6.6% of ethyl propionate and 85% of propionic acid.

Example 3

The process of Example 2 was repeated using a charge containing 624 parts of a molal mixture of 1 part diethyl ether, 4.6 parts of water and 4 parts of boron trifluoride. The temperature was raised in 45 minutes to from 150 to 160° C. and maintained in this range for 60 minutes with a pressure between 800 and 900 atmospheres. 732 parts of product were discharged which, upon analysis, gave a yield of 92% propionic acid.

Example 4

The process of Example 2 was repeated with a charge containing 764 parts of a molal mixture containing 1 part of ethanol, 1.8 parts of water and 2.7 parts of boron trifluoride. These reactants were raised within 32 minutes to a temperature ranging between 144 and 158° C. and maintained at that temperature for approximately 60 minutes. The pressure, during this reaction, was held between 250 and 300 atmospheres. 816 parts of product were discharged which, upon analysis, gave a yield of 70% propionic acid.

Example 5

The process of Example 2 was repeated with a charge of 684 parts of a mixture containing, on a molal basis, 1 part of ethanol, 1.8 parts of water, and 2.4 parts of boron trifluoride. This mixture was raised to a temperature between 135 and 150° C. in 26 minutes, maintained at that temperature for 39 minutes, during which a pressure was held between 800 and 900 atmospheres. 842 parts of product was discharged which, upon analysis, gave a yield of approximately 98% propionic acid.

Example 6

The process of Example 2 was repeated with a charge of 742 parts of a mixture, on a molal basis, 1 part of ethanol, 0.07 part of diethyl ether, 1.8 parts of water and 2.86 parts of boron trifluoride. This mixture was raised to a temperature between 141 and 151° C. in 31 minutes, maintained at temperature for 24 minutes and during this period the pressure was held between 800 and 900 atmospheres. 807 parts of product was discharged which, upon analysis, gave a 100% yield of propionic acid.

The crude product from the synthesis contains water, boron trifluoride, propionic acid and, under certain operating conditions, ethyl propionate and hydrocarbons. The recovery of the acid and ester from this crude product may be effected by first removing that portion of the boron fluoride which is readily vaporized by merely heating the product. As it is desirable to recover the boron fluoride driven off during this stage of the recovery, a packed tower, condenser and absorber for the boron fluoride are provided, the latter containing preferably water. The residue from this step is steam distilled to recover the propionic acid and ester. The residual water and boron fluoride may be treated in accord with the processes described in copending application Ser. Nos. 54,329 and 54,351 for the recovery of the boron fluoride in substantially anhydrous form.

From a consideration of the above specification it will be appreciated that many changes may be made in the details therein given without sacrificing any of the advantages thereof or departing from the scope of the invention.

I claim:

1. A process of producing propionic acid which comprises reacting ethanol with carbon monoxide in the presence of boron fluoride and water, as the catalyst, at a temperature between 125° C. and 180° C., and at a pressure in excess of 25 atmospheres.

2. Process of claim 1 conducted with a molal ratio of boron fluoride to ethanol of greater than 1:1.

3. Process of claim 1 conducted with a molal ratio of boron fluoride to ethanol of from 2 to 3 parts of boron fluoride to 1 part of ethanol.

4. The process of claim 1 conducted with a reactant mixture substantially saturated with boron trifluoride.

5. The process of claim 1 conducted with a molal ratio of water to ethanol of greater than 1:1 wherein the water-ethanol solution is substantially saturated with boron trifluoride.

6. The process of claim 1 in which the ratio of boron trifluoride to ethanol is more than 2 mols of boron trifluoride per mol of ethanol.

7. The process which comprises producing aliphatic organic saturated monocarboxylic acids by the interaction of alcohols higher than methanol with carbon monoxide, using boron fluoride in the presence of water as the catalyst, at a temperature between 125° C. and 180° C., and pressures in excess of 25 atmospheres.

8. A process for the preparation of propionic acid which comprises absorbing carbon monoxide in a reaction mixture containing substantially 1 mol of ethanol, 1.8 mols of water, and 2.8 mols of boron trifluoride at a temperature between 135° C. and 165° C. and under a pressure between 800 and 900 atmospheres.

DONALD J. LODER.